UNITED STATES PATENT OFFICE.

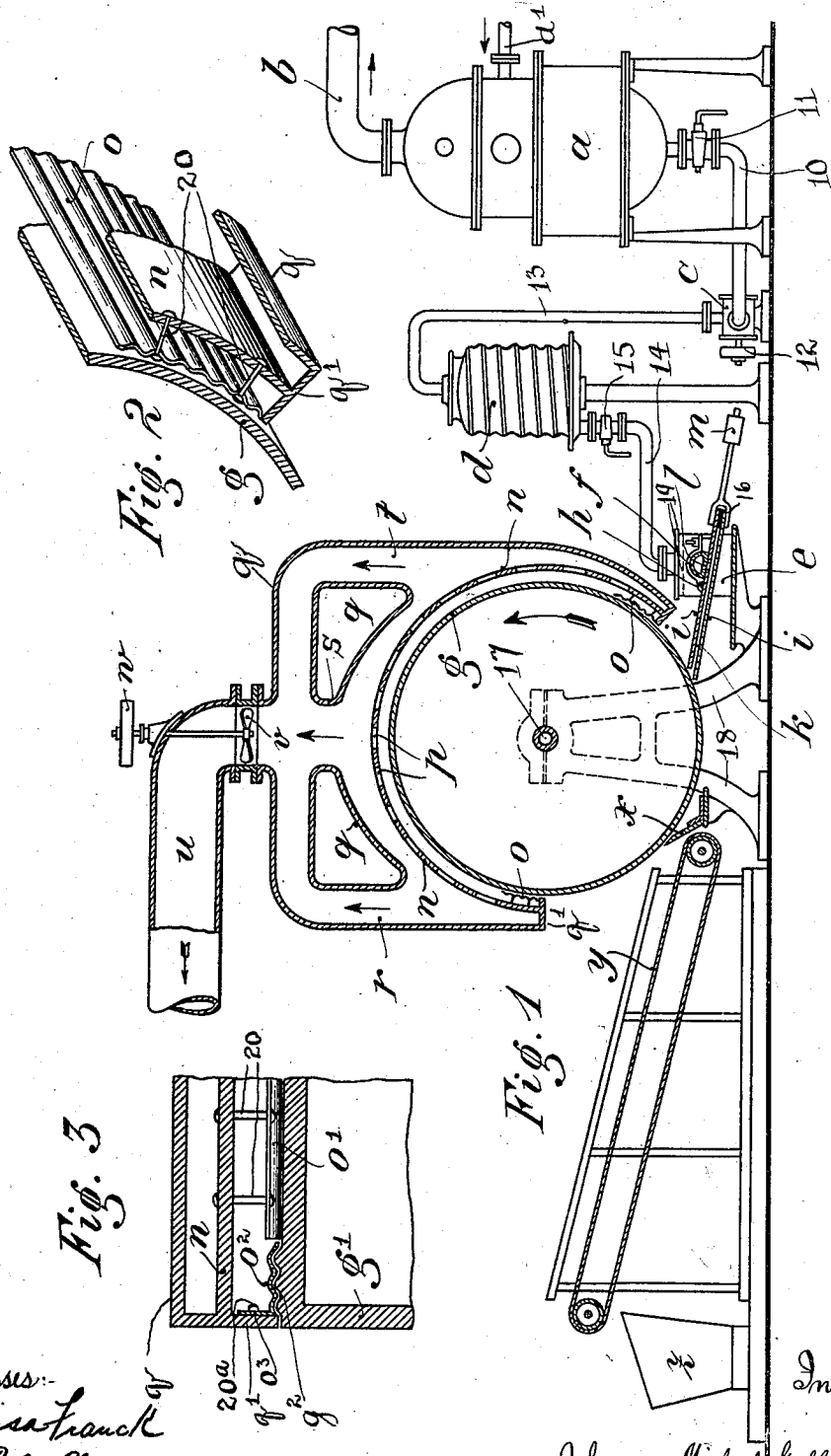

JOHANN MICHAEL GABLER-SALITER, OF OBERGÜNZBURG, GERMANY.

DESICCATING APPARATUS.

1,046,767.  Specification of Letters Patent.   Patented Dec. 10, 1912.

Original application filed October 4, 1911, Serial No. 652,746. Divided and this application filed March 29, 1912. Serial No. 687,054.

*To all whom it may concern:*

Be it known that I, JOHANN MICHAEL GABLER-SALITER, subject of the German Emperor, residing at Obergünzburg, Algau, Bavaria, German Empire, have invented certain new and useful Improvements in Desiccating Apparatus, of which the following is a specification.

My invention relates to desiccating apparatus, and is particularly applicable for desiccating milk and like substances by a two-phase desiccation in a single operation, the two-phase desiccation comprising a first step of partial desiccation *in vacuo*, and a second step of desiccation at a relatively higher pressure than that prevailing in the vacuum chamber.

This application, which is a division of my co-pending application filed October 4th, 1911, Serial Number 652,746, relates to the preferred form of apparatus for performing the desiccation process above referred to in general terms.

The invention is illustratively exemplified in the accompanying drawing, wherein—

Figure 1 is a schematic view, parts being shown in section, of a plant to which my invention is applied; Fig. 2 is a detail sectional view of a distinctive form of packing employed; and Fig. 3 is a similar view of a modified form of packing.

I will now proceed to give a detailed description of my invention, indicating in the course thereof the functions and coöperative relation of the several parts of the device.

The raw milk is fed through the pipe $a'$ into an evaporating receptacle $a$ wherein a part of the water contained in the milk is evaporated. The receptacle $a$ may be provided with a pipe $b$ leading to a vacuum pump (not shown) in order that the vaporization may be effected *in vacuo*. After treatment in the receptacle $a$ the partially concentrated milk passes through the pipe 10, controlled by the cock 11, into a receiver $c$ which is in communication with the pump 12. The pump forces the milk through the pipe 13 into a cooling chamber $d$ wherein the milk is cooled to 10°–5° C., dependent on the temperature of the water which is used in $d$ for cooling purposes. The milk then passes through the pipe 14, controlled by a cock 15 into a container $e$ which communicates with a pipe $f$ extending outwardly from the container $e$ the entire length of the drying drum $g$ hereinafter described. The pipe $f$ which is revoluble in bearings $h$, clamped to the container $e$ has connected thereto two plates $i$ between which a narrow elongated space or aperture $k$ is formed. These plates are preferably of unequal length as shown. The container $e$ is in communication with a slot $l$ formed in and extending the entire length of the pipe $f$, and through the slot $l$ and space $k$ the concentrated milk issues. The pipe $f$ and plates $i$ are counterbalanced by a clamp 16 carrying a weight $m$, in order that the pipe $f$ may be so rotated in its bearings that the ends of the plates $i$ directed toward the drum $g$ may be on a higher horizontal plane that the level of milk in the container $e$. By this arrangement, and by the provision of a float 19 (indicated by a dotted line) in the chamber $e$ which acts to cut off the supply of milk to the latter when the flow is too great, the issuance of milk from between the plates $i$ is suitably regulated.

The drum $g$ is fixed to a shaft 17 revoluble in suitable standards or bearings 18. As the drum revolves it produces a suction action whereby the milk is drawn from between the plates $i$ and is caused to spread, as a uniformly thin stratum or layer like a band or ribbon, over the entire periphery of the drum. The drum $g$ is heated by water or steam (the means therefor not being shown) so that the outer face thereof has a temperature of from 90° to 95° C. The stratum of milk on the periphery of the drum is quickly heated and by the revolution of the drum is carried into a vacuum chamber formed by the jacket $n$ surrounding a part of the drum $g$ suitable air excluding packing $o$ being interposed between the jacket and drum. Although any suitable packing may be employed, I prefer to use either the type shown in Fig. 2 or that shown in Fig. 3. In the form illustrated in Fig. 2, I provide a section of corrugated metal $o$ which is coextensive in length with the drum $g$. At its lower end the metal section $o$ is suitably attached to the inturned end $q'$ of the casing $q$, and is held in position by rivets or bolts 20 secured to the jacket $n$. In the form of Fig. 3, $o$ designates a section of corrugated metal which, however, stops short of the end or head of the drum $g'$. The portion of the drum $g'$ between the end of the corrugated metal $o'$ and the extreme outer end of said drum is fluted, as shown at $g^2$, and is covered by a short section of corrugated metal $o^2$ having a flange $o^3$ secured by a rivet $20^a$ to the inturned end $q'$ of the casing $q$. It is to be understood that the packing $o$ need not be absolutely air-tight, inasmuch as the hot air and vapors arising within the vacuum chamber, and the revolution of the drum $g$, serve in large part, to prevent the admission of cold air. The jacket $n$ is provided with apertures $p$ through which fermentation gases are drawn off in a manner hereinafter explained. The jacket $n$ is inclosed by an exterior jacket or casing $q$, having branch pipes $r$, $s$, $t$ leading to a main exhaust pipe $u$, wherein a fan $v$ having the pulley $w$, is driven to constantly produce a moderate vacuum in the jackets $n$ and $q$.

Within the jackets $n$ and $q$ the partial desiccation *in vacuo* occurs, and the fermentation vapors, as quickly as they are generated, are sucked by the fan $v$ through the apertures $p$ and are carried out of the apparatus without being given opportunity to come into contact with the layer of milk on the drum $g$.

After the layer of milk passes the vacuum chamber formed by the jacket $n$, it revolves with the drum in the open air, for the space of time represented by the distance from the left hand packing $o$ to the scraper $x$, and the desiccation is thus completed as a continuous process by the open air method. The scraper $x$ serves to remove the milk from the drum, the desiccated milk falling onto a conveyer $y$ by which it is carried into the receiver $z$ or to any other desired place and after being again cooled is in condition to be packed and shipped.

Having thus described my invention, what I claim as new and desire to secure by Letters Patent is:—

1. In desiccating apparatus, the combination with a drum having a vacuum chamber partially surrounding the same, of means for revolving said drum, and means for feeding the substances to be desiccated to the periphery of the drum.

2. In desiccating apparatus, the combination with a drum and means for revolving the same, of a casing partially surrounding said drum, and means adapted to create a vacuum in said casing.

3. In desiccating apparatus, the combination with a drum and means for revolving the same, of a perforated casing partially surrounding said drum, and a fan adapted to create a vacuum in said casing.

4. In desiccating apparatus, the combination with a receptacle for containing the substances to be desiccated, of means through which said substances are adapted to pass in the form of a thin layer or stratum, a drum in proximity to said means and adapted to receive said substances therefrom, a casing partially surrounding said drum, and means adapted to create a vacuum in said casing.

5. In desiccating apparatus, the combination with a drum and a vacuum chamber partially surrounding the same, of a container for the substance to be desiccated, means for directing said substance in a thin layer or stratum onto the periphery of the drum, and means for creating a vacuum in said chamber.

6. In desiccating apparatus, the combination with a drum and a vacuum chamber partially surrounding the same, of means for directing the substance to be desiccated in a thin layer or stratum onto said drum, and means adapted to simultaneously create a vacuum in said chamber, and exhaust the vapors from said chamber.

7. In desiccating apparatus, the combination with a drum and means for revolving the same, of a perforated jacket partly surrounding said drum, an imperforate casing coextensive with said jacket, there being a vacuum chamber formed between said drum and casing, packing interposed between the ends of the jacket and the drum, and means for feeding the substance to be desiccated onto the periphery of the drum.

8. In desiccating apparatus, the combination with a drum and a vacuum chamber partially surrounding the same, of a container for the substance to be desiccated, and means communicating with said container and automatically adjustable relatively to said drum for feeding said substance onto the periphery of the drum.

9. In desiccating apparatus, the combination with a drum and a vacuum chamber partially surrounding the same, of a container for the substance to be desiccated, a pipe extending outwardly from said container, and a pair of spaced plates in communication with said pipe and adapted to feed the substance to be desiccated from the container to the periphery of the drum.

10. In desiccating apparatus, the combination with a drum, of a perforated jacket partially surrounding the same, packing interposed between each end of the jacket and the drum, a container for the substance to be desiccated, and adjustable means for feeding said substance in a layer or stratum from said container onto said drum.

11. In desiccating apparatus, the combination with a drum, of a perforated jacket partially surrounding the same, packing interposed between each end of the jacket and the drum, an imperforate casing surrounding the jacket and the portion of the drum coextensive with the latter, there being a vacuum chamber formed between the drum and casing, a fan in said vacuum chamber for creating a partial vacuum therein a container for the substance to be desiccated, a pipe revoluble in said container and extending outwardly therefrom parallel to the drum, and a pair of spaced plates in communication with said pipe and adapted to feed said substance from the container onto the periphery of the drum.

In testimony whereof I have affixed my signature in presence of two witnesses.

JOHANN MICHAEL GABLER-SALITER.

Witnesses:
RUDOLF AICKELIN,
ANTON NAUER.